United States Patent
Kittinger et al.

(10) Patent No.: US 11,876,300 B2
(45) Date of Patent: Jan. 16, 2024

(54) ANTENNA SYSTEM FOR A VEHICLE

(71) Applicant: GM GLOBAL TECHNOLOGY OPERATIONS LLC, Detroit, MI (US)

(72) Inventors: Gregg R. Kittinger, Oakland Township, MI (US); Duane S. Carper, Davison, MI (US); Nahel Eshaq, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 17/725,824

(22) Filed: Apr. 21, 2022

(65) Prior Publication Data

US 2023/0344120 A1 Oct. 26, 2023

(51) Int. Cl.
| | |
|---|---|
| *H01Q 1/32* | (2006.01) |
| *H01Q 3/24* | (2006.01) |
| *H01Q 3/34* | (2006.01) |
| *H04B 1/16* | (2006.01) |
| *H01Q 21/28* | (2006.01) |

(52) U.S. Cl.
CPC ............. *H01Q 3/247* (2013.01); *H01Q 1/32* (2013.01); *H01Q 3/34* (2013.01); *H01Q 21/28* (2013.01); *H04B 1/1615* (2013.01)

(58) Field of Classification Search
CPC .. H01Q 1/24; H01Q 1/32; H01Q 3/24; H01Q 3/247; H01Q 3/26; H01Q 3/34; H01Q 21/28; H04B 1/16; H04B 1/1615
See application file for complete search history.

(56) References Cited

U.S. PATENT DOCUMENTS

| | | | | |
|---|---|---|---|---|
| 6,831,611 | B2* | 12/2004 | Ooe | H01Q 7/00 343/714 |
| 6,867,739 | B2* | 3/2005 | Prassmayer | H01Q 1/1278 343/704 |
| 7,564,415 | B2* | 7/2009 | Rabinovich | H01Q 21/28 343/905 |
| 8,842,044 | B2* | 9/2014 | Nysen | H01Q 1/243 343/702 |
| 10,044,100 | B2* | 8/2018 | Abe | H01Q 1/3233 |
| 10,573,952 | B2* | 2/2020 | Shukutani | H01Q 21/24 |
| 10,665,940 | B2* | 5/2020 | Russell | H01Q 5/40 |
| 10,879,600 | B2* | 12/2020 | Kim | H01Q 1/38 |

* cited by examiner

*Primary Examiner* — Tho G Phan
(74) *Attorney, Agent, or Firm* — Quinn IP Law

(57) ABSTRACT

An antenna system for a vehicle includes a first antenna array affixed to the vehicle and a remote antenna system. A first connector is affixed to the vehicle, and is connected to the controllable switch. The remote antenna system includes a second antenna array including a second active antenna and a wiring harness. The wiring harness includes a second signal lead connected to the second active antenna, a ground lead, and a second connector. The signal lead and the ground lead connect the second active antenna of the second antenna array to the second connector. The first connector is connectable to the second connector, and the switch array communicates signals from the second antenna array to the on-vehicle controller when the second connector of the second antenna array is connected to the first connector.

19 Claims, 2 Drawing Sheets

ANTENNA SYSTEM FOR A VEHICLE

INTRODUCTION

Vehicles employ embedded antenna arrays to facilitate short-range and long-range wireless communication. An aftermarket device or system may be installed on-vehicle that partially or completely blocks a one or more antennae of an antenna array from sending or receiving radio waves. Examples of aftermarket devices or systems that partially or completely block one or more antennae from sending or receiving radio waves include, e.g., a camper or a ladder rack mounted on a pickup truck, a cube van mounted on a truck frame, etc.

SUMMARY

There is a need for a second or auxiliary antenna array that may be affixed onto a vehicle to facilitate sending and receiving radio waves when a first or primary antenna array is partially or completely blocked.

An antenna system for a vehicle includes a first antenna array affixed to the vehicle and a remote antenna system. The first antenna array includes a first active antenna and an on-vehicle switch array including a controllable switch. A first connector is affixed to the vehicle, and is connected to the controllable switch via a first signal lead. The remote antenna system includes a second antenna array including a second active antenna and a wiring harness. The wiring harness includes a second signal lead connected to the second active antenna, a ground lead, and a second connector. The first active antenna is connected to the controllable switch, and the controllable switch is in communication with an on-vehicle controller. The signal lead and the ground lead connect the second active antenna of the second antenna array to the second connector. The first connector is connectable to the second connector, and the switch array communicates signals from the second antenna array to the on-vehicle controller when the second connector of the second antenna array is connected to the first connector.

An aspect of the disclosure includes the switch array communicating signals from the first antenna array to the on-vehicle controller when the second connector of the second antenna array is disconnected from the first connector.

Another aspect of the disclosure includes activation power for the controllable switch being supplied from the first active antenna.

Another aspect of the disclosure includes the second antenna array including a ground lead that is connectable to a ground plane; wherein the controllable switch is activated to a first state to communicate signals from the first antenna array to the on-vehicle controller when the second connector of the second antenna array is disconnected from the first connector; and wherein the controllable switch is activated to a second state to communicate signals from the second antenna array to the on-vehicle controller when the second connector of the second antenna array is connected to the connector.

Another aspect of the disclosure includes the second active antenna being identical in function to the first active antenna.

Another aspect of the disclosure includes the first active antenna and the second active antenna being GNSS antennae.

Another aspect of the disclosure includes the first active antenna and the second active antenna being AM/FM antennae.

Another aspect of the disclosure includes the first active antenna and the second active antenna being satellite radio antennae.

Another aspect of the disclosure includes the first antenna array having a first passive antenna, the second antenna array having a second passive antenna, and wherein the second passive antenna is identical in function to the first passive antenna.

Another aspect of the disclosure includes the switch array communicating signals from the second antenna array including the second passive antenna to the on-vehicle controller when the first connector of the second antenna array is connected to the second connector.

Another aspect of the disclosure includes the first antenna array being integrated into a body panel of the vehicle, and the second antenna array being on-vehicle at a remote location.

Another aspect of the disclosure includes the controllable switch being a single-pole, double-throw switch.

Another aspect of the disclosure includes the switch array communicating signals from the first antenna array to the on-vehicle controller upon detection of a fault associated with the second antenna array.

Another aspect of the disclosure includes an antenna system for a vehicle that includes a first antenna array affixed to the vehicle, wherein the first antenna array includes a first plurality of antennae; an on-vehicle switch array including a plurality of controllable switches; a first connector affixed to the vehicle; a remote antenna system, the remote antenna system including a second antenna array including a second plurality of antennae and a wiring harness; and the wiring harness including a plurality of signal leads connected to the second antenna array, a ground lead, and a second connector. The first connector is connected to the controllable switch via a first signal lead. The first plurality of antennae is connected to the plurality of controllable switches. The plurality of controllable switches is in communication with an on-vehicle controller. The plurality of signal leads and the ground lead connect to the second connector. The first connector is connectable to the second connector. The switch array selectively communicates signals from the second plurality of antennae to the on-vehicle controller when the second connector of the second antenna array is connected to the first connector.

Another aspect of the disclosure includes the switch array automatically communicating signals from the first antenna array to the on-vehicle controller when the second connector of the second antenna array is disconnected from the first connector.

Another aspect of the disclosure includes activation power for the controllable switch being supplied from the first antenna.

Another aspect of the disclosure includes the second antenna array including a ground lead that is connectable to a ground plane, wherein the plurality of controllable switches are controlled to a first state to communicate signals from the first antenna array to the on-vehicle controller when the second connector of the second antenna array is disconnected from the first connector. The plurality of controllable switches is controlled to a second state to communicate signals from the second antenna array to the on-vehicle controller when the second connector of the second antenna array is connected to the connector.

Another aspect of the disclosure includes the second antenna array being identical in function to the first antenna array.

Another aspect of the disclosure includes the switch array communicating signals from the first antenna array to the on-vehicle controller upon detection of a fault associated with the second antenna array.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
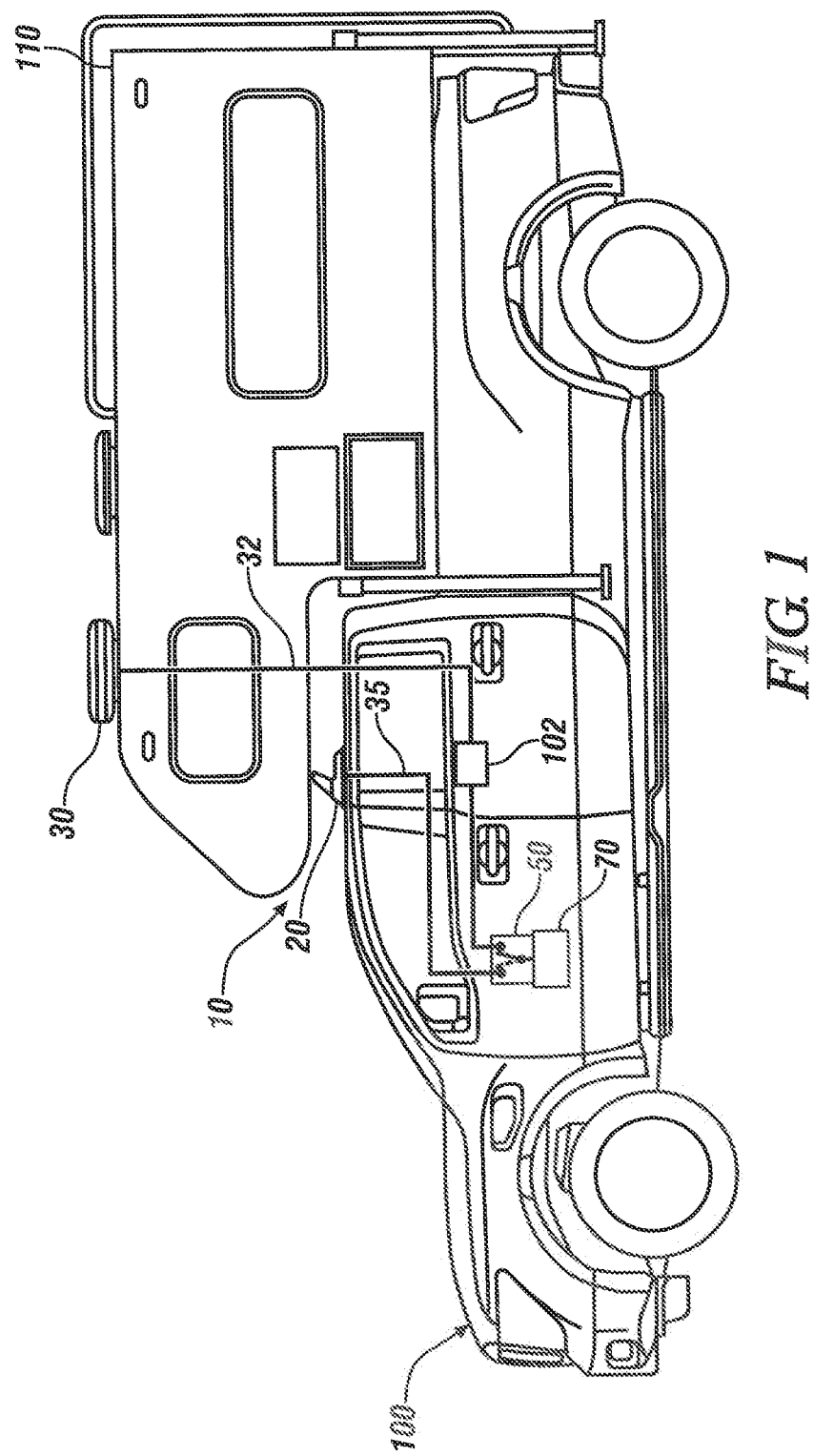
FIG. 1 pictorially illustrates a vehicle including an antenna system including a first antenna array and a second antenna array, in accordance with the disclosure.

The present disclosure is susceptible to various modifications and alternative forms, and some representative embodiments have been shown by way of example in the drawings and will be described in detail herein. Novel aspects of this disclosure are not limited to the forms illustrated in the drawings. Rather, the disclosure is intended to cover modifications, equivalents, combinations, or alternatives falling within the spirit and scope of the disclosure as defined by the appended claims.

DETAILED DESCRIPTION

The following detailed description is merely exemplary in nature and is not intended to limit the application and uses. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure.

Furthermore, the disclosure, as illustrated and described herein, may be practiced in the absence of an element that is not specifically disclosed herein.

The use of ordinals such as first, second and third does not necessarily imply a ranked sense of order, but rather may only distinguish between multiple instances of an act or structure.

Referring to the drawings, wherein like reference numerals are used to identify like or identical components in the various views, FIG. 1 schematically depicts a vehicle 100 having an antenna system 10 that includes a first antenna array 20 that is affixed on or in a body panel of the vehicle 100, and a second, remote antenna system 30 that includes a second antenna array 40 that is affixed onto a remote location of the vehicle 100. The vehicle 100 may include, but is not limited to, a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure.

The vehicle 100 has an aftermarket device 110 added thereto, which is a bed camper in one embodiment and as shown. The aftermarket device 110 at least partially blocks and interferes with wireless communication to and from the first antenna array 20. The second antenna array 40 is affixed onto the vehicle 100 at a remote location, wherein the remote location is an on-vehicle location that is not physically blocked by a portion of the vehicle 100 or the aftermarket device 110. In one embodiment, the remote location may be arranged on a top portion of the bed camper as shown. Other remote locations that are on-vehicle may be considered, and include other locations at which the aftermarket device 110 does not interfere with or block wireless signal communication to the second antenna array 40.

The vehicle 100 includes a first connector 102 that is affixed to a body panel or another externally accessible site on-vehicle. The first connector 102 is connected to a controllable switch array 50, which connects to and communicates with one or multiple on-vehicle controller(s) 70. The second antenna array 40 of the remote antenna system 30 connects via a second wiring harness 32 to a second connector 35. The second connector 35 mates with and plugs into the first connector 102 that is on-vehicle. The first connector 102 and the second connector 35 are RF (radio-frequency) connectors that are designed to work in the radio frequency range. Additional details are described with reference to FIG. 2.

Figure 2:
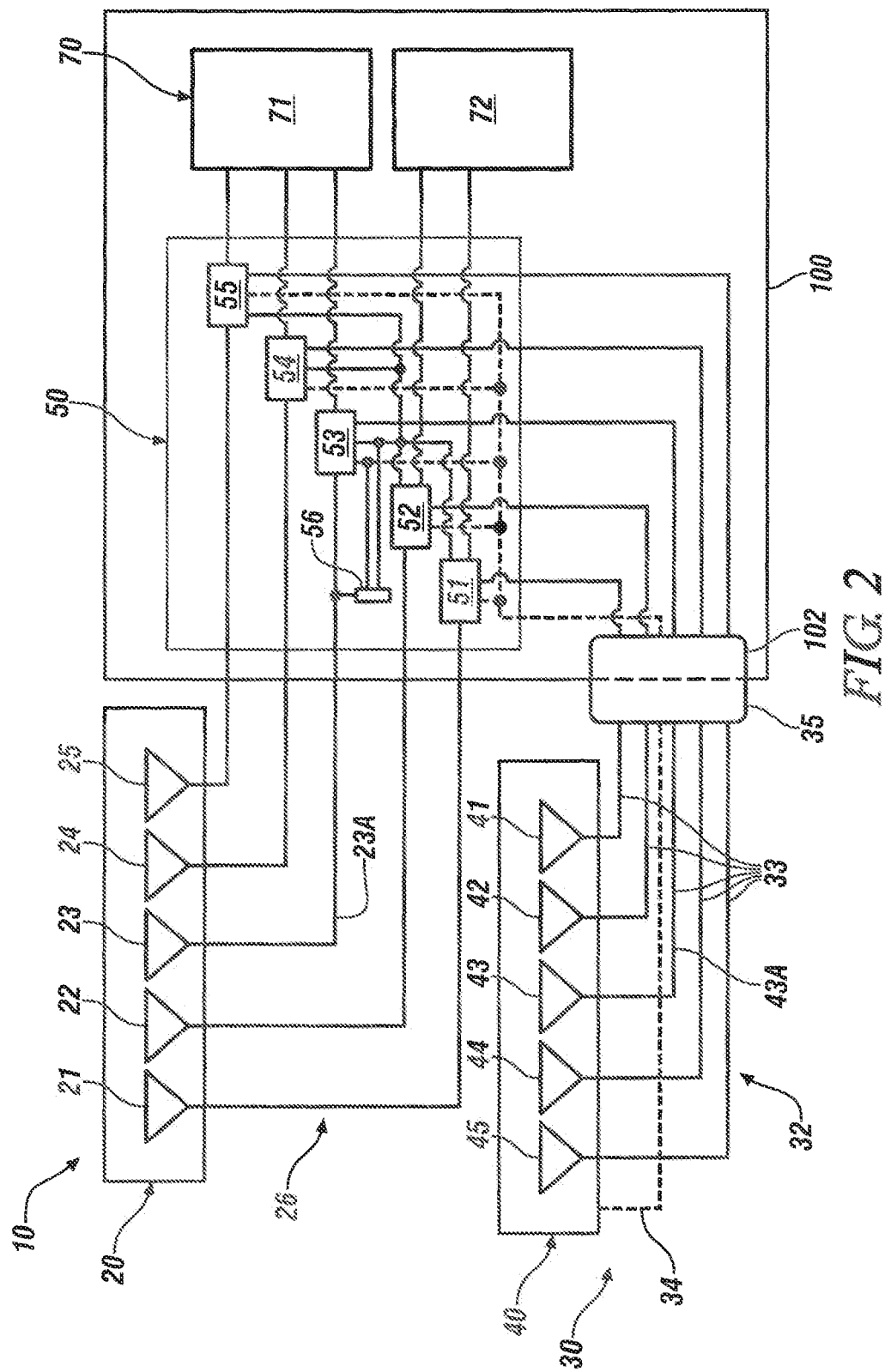
FIG. 2 schematically illustrates an antenna system including a first antenna array and a second antenna array, in accordance with the disclosure.

Referring now to FIG. 2, with continued reference to FIG. 1, details related to the antenna system 10 are schematically illustrated, including the first antenna array 20 that is affixed on or in a body panel of the vehicle 100, and the remote antenna system 30 including the second antenna array 40 that is affixed onto a remote location of the vehicle 100. The antenna system 10 also includes a switch array circuit 50, which facilitates and manages communication between the first antenna array 20, the second antenna array 40, and one or multiple on-vehicle controllers 70, e.g., a telematics controller 71 and a vehicle controller 72.

The telematics controller 71 is an element of a wireless telematics communication system that is capable of extra-vehicle communication for communicating with a communication network system having wireless and wired communication capabilities. The extra-vehicle communication includes short-range vehicle-to-vehicle (V2V) communication and/or vehicle-to-everything (V2x) communication, which may include communication with an infrastructure monitor, e.g., a traffic camera, and communication to a proximal pedestrian, etc. Alternatively, or in addition, the wireless telematics communication system may be capable of short-range wireless communication to a handheld device, e.g., a cell phone, a satellite phone or another telephonic device. In one embodiment the handheld device is loaded with a software application that includes a wireless protocol to communicate with the telematics controller 71, and the handheld device executes the extra-vehicle communication for communicating with an off-board controller via a communication network, which may be in the form of a satellite, a cell tower antenna, and/or another mode of communication.

The first antenna array 20 includes a plurality of antennae that prove different functions that may be employed on-vehicle. By way of non-limiting examples, a first antenna 21 transmits and/or receives signals in the AM/FM radio broadcast frequency range, a second antenna 22 transmits and/or receives signals related to a satellite radio broadcast frequency range, a third antenna 23 transmits and/or receives signals related to a Global Navigation Satellite System (GNSS) or GPS, a fourth antenna 24 transmits and/or receives signals related to a cellular phone service, and a fifth antenna 25 transmits and/or receives signals related to a Dedicated Short Range Communication (DSRC) service, e.g., vehicle-to-vehicle (V2V), vehicle to infrastructure (V2I), etc. Other antennae, without limitation, may be employed by the first antenna array 20.

The first, second, third, fourth, and fifth antennae 21, 22, 23, 24, 25 of the first antenna array 20 connect via a first wiring harness 26 to the switch array circuit 50 for communication to the on-vehicle controllers 70, e.g., telematics controller 71 and vehicle controller 72.

At least one of the plurality of antennae of the first antenna array 20 is an active antenna that includes one or multiple electronic devices, e.g., an amplifier. The wiring cable connected to the active antenna is a coaxial cable that is capable of transferring electric power to the electronic device(s) of the respective antenna. In one embodiment, the third antenna 23 that is configured as a GNSS antenna is an active antenna, with coaxial cable 23A arranged to transfer low-voltage DC electric power thereto. Any one of or all of the cables of the first wiring harness 26 may be coaxial cable that is capable of transferring electric power to the electronic device(s) of the respective antenna The remote antenna system 30 includes the second antenna array 40, second wiring harness 32, second connector 35, and a ground (GND) 34. The ground 34 connects via the second wiring harness 32 to the second connector 35. The remote or second antenna array 40 includes a plurality of antennae that provide communication functions that may be employed on-vehicle, with the plurality of antennae of the second antenna array 40 being identical to the plurality of antennae of the first antenna array 20. By way of non-limiting examples, first antenna 41 transmits and/or receives signals in the AM/FM radio broadcast frequency range, second antenna 42 transmits and/or receives signals related to a satellite radio broadcast frequency range, third antenna 43 transmits and/or receives signals related to a Global Navigation Satellite System (GNSS) or GPS, fourth antenna 44 transmits and/or receives signals related to a cellular phone service, and fifth antenna 45 transmits and/or receives signals related to a Dedicated Short Range Communication (DSRC) service, e.g., vehicle-to-vehicle (V2V), vehicle to infrastructure (V2I), etc. Corresponding to the arrangement of the first antenna array 20, the second antenna array 40 includes third antenna 43 as an active antenna that includes one or multiple electronic devices, e.g., an amplifier. Cable 43A connected to the active third antenna 43 is a coaxial cable that is capable of transferring electric power to the electronic device(s), analogous to wiring cable 23A. In one embodiment, the third antenna 43 that is configured as a GNSS antenna is an active antenna, with cable 43A arranged to transfer low-voltage DC electric power thereto.

The second wiring harness 32 includes a plurality of signal leads 33 arranged in parallel that connect the first, second, third, fourth, and fifth antennae 41, 42, 43, 44, 45 of the second, auxiliary antenna array 40 to the second connector 35. The second wiring harness 32 also includes ground 34, which connects to the second connector 35. Any one of or all of the signal leads 33 of the second wiring harness 32 may be coaxial cable that is capable of transferring electric power to the electronic device(s) of the respective antenna.

The switch array circuit 50 includes plurality of controllable switches that are arranged to selectively control signal communication between the first antenna array 20, the second antenna array 40, and the on-vehicle controllers 70, e.g., telematics controller 71 and vehicle controller 72. As shown the plurality of controllable switches includes first switch 51, second switch 52, third switch 53, fourth switch 54, and fifth switch 55. The first switch 51, second switch 52, third switch 53, fourth switch 54, and fifth switch 55 correspond to the first, second, third, fourth, and fifth antennae 21, 22, 23, 24, 25 of the first antenna array 20, and also correspond to the first, second, third, fourth, and fifth antennae 41, 42, 43, 44, 45 of the second, auxiliary antenna array 40.

Each of the plurality of controllable switches of the switch array circuit 50 is a single pole, double throw (SPDT) switch that is arranged as a dual input/single output configuration. The dual inputs of the first switch 51, second switch 52, third switch 53, fourth switch 54, and fifth switch 55 include signal inputs from the respective first, second, third, fourth, and fifth antennae 21, 22, 23, 24, 25 of the first antenna array 20, and the respective first, second, third, fourth, and fifth antennae 41, 42, 43, 44, 45 of the second, auxiliary antenna array 40.

Electric power to the first switch 51, second switch 52, third switch 53, fourth switch 54, and fifth switch 55 is provided via the coaxial cable 23A that is arranged to transfer low-voltage DC electric power. The low-voltage DC electric power from the coaxial cable 23A may be subjected to a voltage divider 56 to achieve a requisite voltage for powering the plurality of switches of the switch array circuit 50.

Activation of the first switch 51, second switch 52, third switch 53, fourth switch 54, and fifth switch 55 is effected by the ground 34 that connects via the second wiring harness 32 to the second connector 35 in the following manner. When the ground 34 is disconnected, i.e., when the second connector 35 of the second antenna array 40 is disconnected from the first connector 102, the first switch 51, second switch 52, third switch 53, fourth switch 54, and fifth switch 55 are controlled to a first state, and the respective first, second, third, fourth, and fifth antennae 21, 22, 23, 24, 25 of the first antenna array 20 are in communication with the on-vehicle controllers 70, e.g., the telematics controller 71 and vehicle controller 72. When the ground 34 is connected, i.e., when the second connector 35 of the second antenna array 40 is connected to the first connector 102, the first switch 51, second switch 52, third switch 53, fourth switch 54, and fifth switch 55 are controlled to a second state, and the respective first, second, third, fourth, and fifth antennae 41, 42, 43, 44, 45 of the second, auxiliary antenna array 40 are in communication with the on-vehicle controllers 70, e.g., the telematics controller 71 and vehicle controller 72.

The concepts described herein provide a system that automatically switches between two antenna arrays without compromising the original vehicle hardware configuration. The arrangement of a hardware design that includes fast switching and low current draw fit within current vehicle telematics architecture. There can be 2 sets of diagnostic algorithms to distinguish between factory antenna and accessory antenna without compromising or modifying existing architecture, with a fail-soft design to default to factory antenna system. The system also employs existing phantom fed circuits.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative only and not as limiting.

What is claimed is:

1. An antenna system for a vehicle, comprising:
    a first antenna array affixed to the vehicle, the first antenna array including a first active antenna;
    an on-vehicle switch array including a controllable switch;
    a first connector affixed to the vehicle, and connected to the controllable switch via a first signal lead;
    a remote antenna system, the remote antenna system including a second antenna array including a second active antenna and a wiring harness; and
    the wiring harness including a second signal lead connected to the second active antenna, a ground lead, and a second connector,
    wherein the first active antenna is connected to the controllable switch;
    wherein the controllable switch is in communication with an on-vehicle controller;
    wherein the second signal lead and the ground lead connect the second active antenna of the second antenna array to the second connector;
    wherein the first connector is connectable to the second connector; and
    wherein the switch array selectively communicates signals from the second antenna array to the on-vehicle controller when the second connector of the second antenna array is connected to the first connector.

2. The antenna system of claim 1, wherein the switch array communicates signals from the first antenna array to the on-vehicle controller when the second connector of the second antenna array is disconnected from the first connector.

3. The antenna system of claim 1, wherein activation power for the controllable switch is supplied from the first active antenna.

4. The antenna system of claim 3,
    wherein the second antenna array includes a ground lead that is connectable to a ground plane;
    wherein the controllable switch is activated to a first state to communicate signals from the first antenna array to the on-vehicle controller when the second connector of the second antenna array is disconnected from the first connector; and
    wherein the controllable switch is activated to a second state to communicate signals from the second antenna array to the on-vehicle controller when the second connector of the second antenna array is connected to the second connector.

5. The antenna system of claim 1, wherein the second active antenna is identical in function to the first active antenna.

6. The antenna system of claim 5, wherein the first active antenna and the second active antenna comprise GNSS antennas.

7. The antenna system of claim 5, wherein the first active antenna and the second active antenna comprise AM/FM antennas.

8. The antenna system of claim 5, wherein the first active antenna and the second active antenna comprise satellite radio antennas.

9. The antenna system of claim 1, wherein the first antenna array further comprises a first passive antenna, wherein the second antenna array further comprises a second passive antenna, and wherein the second passive antenna is identical in function to the first passive antenna.

10. The antenna system of claim 9, wherein the switch array communicates signals from the second antenna array including the second passive antenna to the on-vehicle controller when the first connector of the second antenna array is connected to the second connector.

11. The antenna system of claim 1, wherein the first antenna array is integrated into a body panel of the vehicle, and wherein the second antenna array is affixed on-vehicle at a remote location.

12. The antenna system of claim 1, wherein the controllable switch comprises a single-pole, double-throw switch.

13. The antenna system of claim 1, wherein the switch array communicates signals from the first antenna array to the on-vehicle controller upon detection of a fault associated with the second antenna array.

14. An antenna system for a vehicle, comprising:
    a first antenna array affixed to the vehicle, the first antenna array including a first plurality of antennas;
    an on-vehicle switch array including a plurality of controllable switches;
    a first connector affixed to the vehicle;
    a remote antenna system, the remote antenna system including a second antenna array including a second plurality of antennas and a wiring harness; and
    the wiring harness including a plurality of signal leads connected to the second antenna array, a ground lead, and a second connector, wherein the first connector is connected to the controllable switch via a first signal lead;

wherein the first plurality of antennas is connected to the plurality of controllable switches;

wherein the plurality of controllable switches is in communication with an on-vehicle controller;

wherein the plurality of signal leads and the ground lead connect to the second connector;

wherein the first connector is connectable to the second connector; and wherein the switch array selectively communicates signals from the second plurality of antennas to the on-vehicle controller when the second connector of the second antenna array is connected to the first connector.

15. The antenna system of claim 14, wherein the switch array automatically communicates signals from the first antenna array to the on-vehicle controller when the second connector of the second antenna array is disconnected from the first connector.

16. The antenna system of claim 14, wherein activation power for the plurality of controllable switches is supplied from the first antenna.

17. The antenna system of claim 16, wherein the second antenna array includes a ground lead that is connectable to a ground plane;

wherein the plurality of controllable switches are controlled to a first state to communicate signals from the first antenna array to the on-vehicle controller when the second connector of the second antenna array is disconnected from the first connector; and wherein the plurality of controllable switches is controlled to a second state to communicate signals from the second antenna array to the on-vehicle controller when the second connector of the second antenna array is connected to the first connector.

18. The antenna system of claim 14, wherein the second antenna array being identical in function to the first antenna array.

19. The antenna system of claim 14, wherein the switch array communicates signals from the first antenna array to the on-vehicle controller upon detection of a fault associated with the second antenna array.

* * * * *